United States Patent
Kim et al.

(10) Patent No.: US 7,940,032 B2
(45) Date of Patent: May 10, 2011

(54) POWER SUPPLY HAVING MAXIMUM POWER POINT TRACKING FUNCTION

(75) Inventors: Jin Wook Kim, Seoul (KR); Sung Soo Hong, Gyunggi-do (KR); Chung Wook Roh, Seoul (KR); Sang Kyoo Han, Daejeon (KR); Jong Sun Kim, Gyunggi-do (KR); Jae Sun Won, Gyunggi-do (KR); Dong Seong Oh, Incheon (KR); Dea Min Jang, Gyunggi-do (KR); Jong Hae Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 279 days.

(21) Appl. No.: 12/262,199

(22) Filed: Oct. 31, 2008

(65) Prior Publication Data

US 2009/0316452 A1    Dec. 24, 2009

(30) Foreign Application Priority Data

Jun. 24, 2008 (KR) .................. 10-2008-0059456

(51) Int. Cl.
    *G05F 1/00*   (2006.01)
(52) U.S. Cl. ........................................ 323/283; 323/284
(58) Field of Classification Search .................. 323/906, 323/207, 282–285; 363/60, 95; 307/45, 307/51
    See application file for complete search history.

(56) References Cited

U.S. PATENT DOCUMENTS

| | | | | |
|---|---|---|---|---|
| 5,654,883 A | * | 8/1997 | Takehara et al. | 363/79 |
| 6,281,485 B1 | * | 8/2001 | Siri | 250/203.4 |
| 6,493,246 B2 | * | 12/2002 | Suzui et al. | 363/95 |
| 7,394,237 B2 | * | 7/2008 | Chou et al. | 323/299 |
| 7,714,550 B2 | * | 5/2010 | Houk et al. | 323/272 |
| 2004/0207366 A1 | * | 10/2004 | Sung | 320/140 |
| 2006/0017327 A1 | | 1/2006 | Siri et al. | |

FOREIGN PATENT DOCUMENTS

| | | |
|---|---|---|
| KR | 1020070078092 A | 7/2007 |
| KR | 1020070078524 A | 8/2007 |
| KR | 100757320 B1 | 9/2007 |

OTHER PUBLICATIONS

Office Action for Korean Patent Application No. 10-2008-0059456 issued May 17, 2010.

* cited by examiner

*Primary Examiner* — Adolf Berhane
*Assistant Examiner* — Emily Pham
(74) *Attorney, Agent, or Firm* — Lowe Hauptman Ham & Berner LLP

(57) ABSTRACT

A power supply having a maximum power point tracking function that controls power switching so that a detected power value is within a reference range having a maximum power point in a predetermined current-voltage curve includes: a converter section switching input power and converting the switched input power into predetermined DC power; and a maximum power point tracking section detecting a power value determined according to a switching operation of the converter section among power values included in a predetermined power-voltage curve, and controlling the switching operation of the converter section so that the detected power value is located within a predetermined reference range having a maximum power value among the power values included in the power-voltage curve.

15 Claims, 3 Drawing Sheets

POWER SUPPLY HAVING MAXIMUM POWER POINT TRACKING FUNCTION

CROSS-REFERENCE TO RELATED APPLICATIONS

This application claims the priority of Korean Patent Application No. 2008-0059456 filed on Jun. 24, 2008, in the Korean Intellectual Property Office, the disclosure of which is incorporated herein by reference.

BACKGROUND OF THE INVENTION

1. Field of the Invention

The present invention relates to power supplies, and more particularly, to a power supply having a maximum power point tracking function that controls power switching so that a detected power value is within a reference range having a maximum power point in a predetermined current-voltage curve.

2. Description of the Related Art

In general, power supplies that supply driving power to home equipment and industrial equipment are necessarily used to drive the equipment.

Recently, among the power supplies, solar photovoltaic power generators have received much attention as new alternative power supplies since they use infinite energy sources that are environment-friendly and will not be drained.

Though these solar photovoltaic power generators have attracted attention as new alternative energy supplies, they have low generation efficiency. Thus, the solar photovoltaic power generators necessarily require maximum power point tracking (MPPT) functions in order to extract maximum power.

A maximum power point at which a solar photovoltaic power generator extracts maximum power varies according to environmental conditions such as solar radiation and surface temperature. An operating point at which the solar photovoltaic power generator generates power is determined by load conditions.

Therefore, in order that the solar photovoltaic power generator extracts the power energy, the operating point needs to be controlled so that the operating point tracks the maximum power point.

However, in order that the operating point tracks the maximum power point, an expensive control device, such as a micro controller, is required, and a complicated peripheral circuit is further required for the control device, which causes an increase in manufacturing costs, and an increase in circuit size.

SUMMARY OF THE INVENTION

An aspect of the present invention provides a power supply having a maximum power point tracking function that controls switching control so that a detected power value is within a reference range having a maximum power point in a predetermined power-voltage curve.

According to an aspect of the present invention, there is provided a power supply having a maximum power point tracking function, the power supply including: a converter section switching input power and converting the switched input power into predetermined DC power; and a maximum power point tracking section detecting a power value determined according to a switching operation of the converter section among power values included in a predetermined power-voltage curve, and controlling the switching operation of the converter section so that the detected power value is located within a predetermined reference range having a maximum power value among the power values included in the power-voltage curve.

The maximum power point tracking section may include: a power detector detecting the power value from the input power; a comparator comparing the power value from the power detector and the maximum power value; a switching controller supplying a switching control signal used to control the switching operation of the converter section according to a comparison result of the comparator; and an initializer initializing the maximum power value when the switching control signal from the switching controller is a switching-off signal.

The power detector may include: a multiplication unit detecting a current and a voltage from the input power to calculate a power value; a peak detection unit detecting the maximum power value among power values from the multiplication unit; and an amplification unit electrically connected between the multiplication unit and the peak detection unit, and amplifying the power value from the multiplication unit.

The initializer may initialize the maximum power value by discharging power charged in the capacitor when the switching control signal is a switching-off signal.

The comparator may add a predetermined offset power value to the detected power value, and compares a result of the addition and the maximum power value, and the offset power value may be a difference between the maximum power value and a minimum power value within the reference range.

The switching controller may be a D flip-flop having a clock terminal receiving the comparison result from the comparator, a Q terminal outputting a signal having a predetermined level, a Q' terminal outputting a signal having an inversion level of a signal level of the Q terminal, and a D terminal receiving the signal from the Q' terminal, and the signal from the Q' terminal is the switching control signal.

The converter section may include: an inductor boosting a voltage level of the input power; a switch switching the power from the inductor according to the switching control signal; a diode rectifying the power switched by the switch; and a capacitor stabilizing the power rectified by the diode.

The power supply may further include an inverter section converting the DC power from the converter section into predetermined AC power.

The input power may be power supplied from a solar array, and the power supply may be a solar photovoltaic power generator generating power using sunlight.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
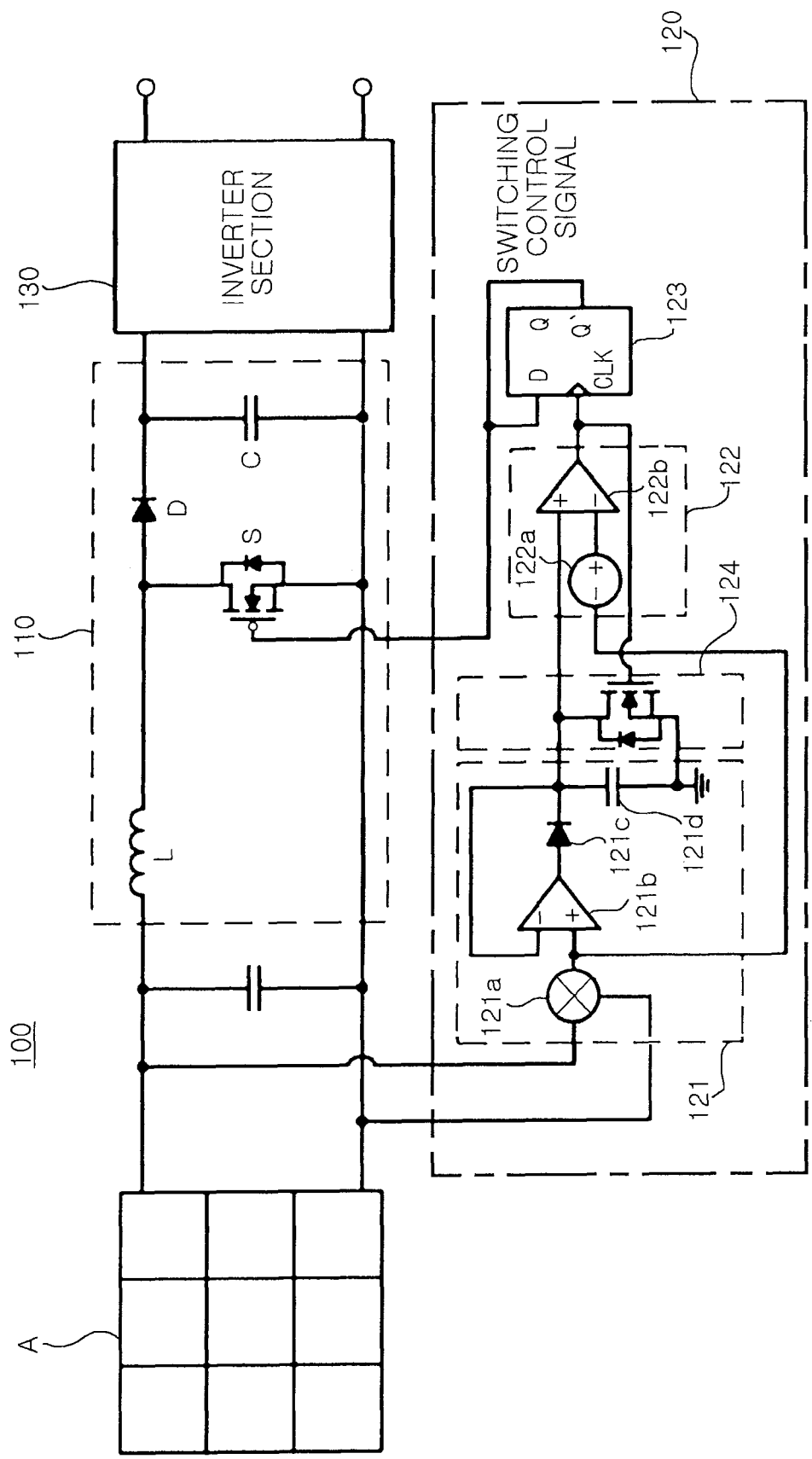
FIG. 1 is a configuration view illustrating a power supply according to an exemplary embodiment of the invention.

FIG. 1 is a configuration view illustrating a power supply according to an exemplary embodiment of the invention.

Referring to FIG. 1, a power supply 100 according to an exemplary embodiment of the invention includes a converter section 110 and a maximum power point tracking section 120.

The converter section 110 switches input power and converts the switched input power into DC power having a predetermined voltage level. The input power may be supplied from a solar array A. The power supply 100 may be a solar photovoltaic generator that generates power using sunlight.

The converter section 110 may include an inductor L, a switch S, a diode D, and a capacitor C.

The inductor L boosts a voltage level of the power from the solar array A. The switch S switches the power whose voltage level is inverted by the inductor L according to a switching control signal. The power switched by the switch S is rectified by the diode D, and stabilized by the capacitor C.

Figure 2A:
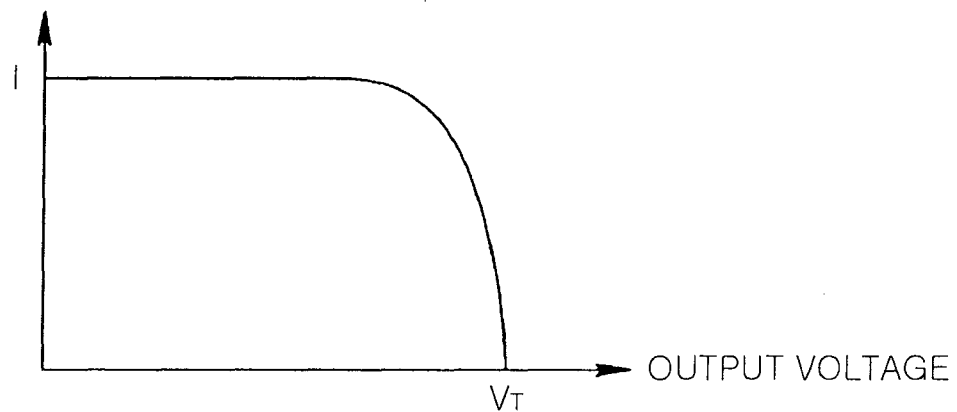
FIG. 2A is a current-voltage graph of a solar array.
Figure 2B:
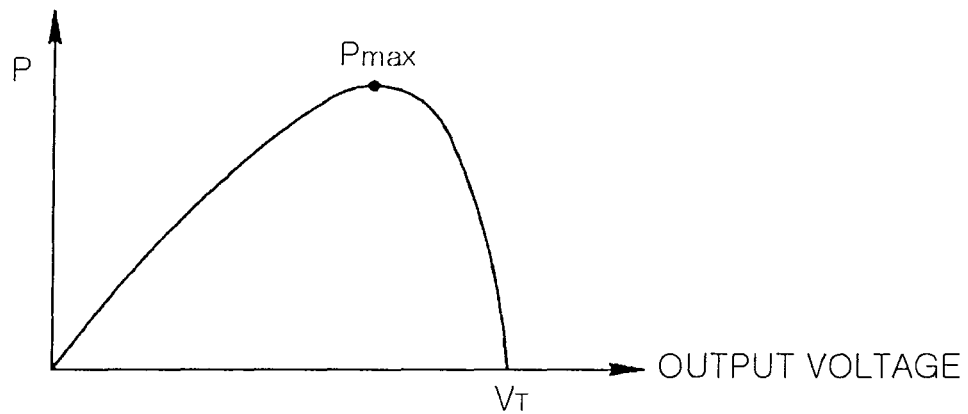
FIG. 2B is a power-voltage graph of a solar array.

A current-voltage curve and a power-voltage curve of the solar array A are shown in FIGS. 2A and 2B, respectively.

FIG. 2A is a current-voltage characteristic curve of a solar array. FIG. 2B is a power-voltage characteristic curve of a solar array.

Referring to FIG. 2A, in the current-voltage characteristic curve of the solar array, a current is constant despite an increase in voltage, and then starts to decreases sharply at a predetermined voltage. On the other hand, in the power-voltage characteristic curve of the solar array, shown in FIG. 2B, power increases with voltage, and then starts to decrease sharply at a maximum power point Pmax.

In the current-voltage characteristic curve of the solar array, the current-voltage characteristic is determined according to solar radiation and temperature.

Referring to FIG. 1, the maximum power point tracking section 120 of the power supply 100 according to the embodiment of the invention includes a power detector 121, a comparator 122, a switching controller 123, and an initializer 124.

The power detector 121 detects power from the solar array A. To this end, the power detector 121 may include a multiplication unit 121a and a peak detection unit. The multiplication unit 121a detects a current and a voltage from the solar array A, and multiplies the detected current and voltage to obtain a power value. The peak detection unit includes a diode 121c and a capacitor 121d connected in parallel with each other, and detects a maximum power value among power values calculated by the multiplication 121a. An amplification unit 121b may be electrically connected between the multiplication 121a and the peak detection unit to previously compensate a power value that is lost due to a voltage drop across the diode 121c.

The comparator 122 compares the maximum power value and the power value detected by the power detector 121, and transmits a result of the comparison to the switching controller 123.

Here, the comparator 122 adds a predetermined offset power value from a voltage source 122a and the power value detected by the power detector 121, compares a result of the addition with the maximum power value by using the comparison unit 122b, and transmits a value of the comparison to the switching controller 123.

The power supply 100 according to the embodiment of the invention causes the power value detected by the solar array A to move along the curve, shown in FIG. 2B, according to the switching-on and switching-off operation of the converter section 110. The maximum power point tracking section 120 controls the switching-on and switching-off operation of the converter section 110 so that the power value detected from the solar array A tracks the maximum power point Pmax.

Specifically, the power detector 121 detects power values from the solar array A, and stores the maximum power value among the detected power values. The comparator 122 adds the power value detected by the power detector 121 and the predetermined offset power value, and then compares a result of the addition and the maximum power value. The comparison result is transmitted to the switching controller 123. The switching controller 123 is composed of a D flip-flop. The D flip-flop includes a clock terminal CLK, a Q terminal Q outputting a signal having a predetermined level, a Q' terminal Q' having a signal level obtained by inverting the level of the Q terminal, and a D terminal D to which an output from the Q' terminal is fed back.

That is, when the comparison result has a low level, a signal having a high level is output from the Q' terminal Q. The signal from the Q' terminal Q controls the turning on and off of the switch S of the converter section 110. That is, the signal from the Q' terminal Q is a switching control signal. When the comparison result has a low level, the switch S of the converter section 110 is turned on, and predetermined DC power is output. When the comparison result has a high level, a switching control signal having a low level is output from the Q' terminal Q, the switch S of the converter section 110 is turned off to thereby cut off the output of the DC power.

The DC power from the converter section 110 may be converted into AC power having a predetermined voltage level by an inverter unit 130. The AC power may be commercial AC power that supplies a current to electronic devices including home appliances. Power that remains unconsumed after the power is used in houses may be transmitted to a power plant.

The maximum power point tracking operation of the maximum power point tracking section 120 according to the embodiment of the invention will be described in detail with reference to FIGS. 3A and 3B.

Figure 3A:
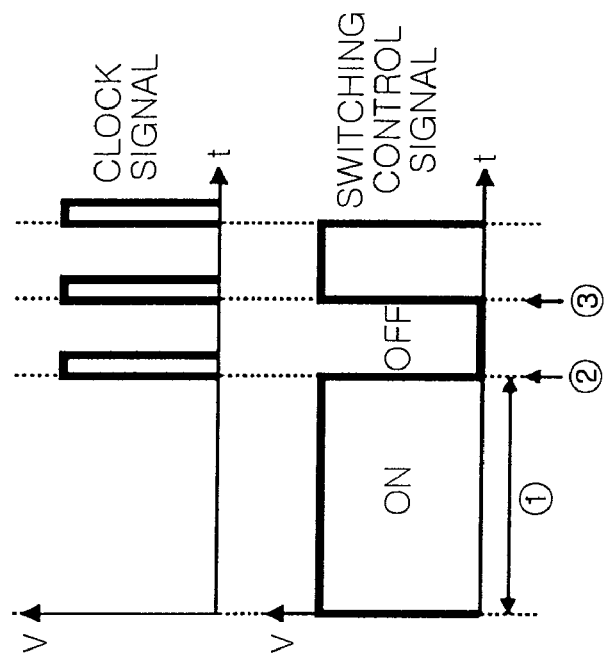
FIG. 3A is a graph illustrating a power value moving in a power-voltage curve of a solar array according to a switching operation of the power supply according to the embodiment of the invention.

FIG. 3A is a view illustrating a power value that moves in a current-voltage curve of a solar array according to the switching operation of the power supply according to the embodiment of the invention. FIG. 3B is a graph illustrating the switching operation of the power supply according to the embodiment of the invention.

Referring to FIG. 1 and FIG. 3A, at initial power up of the converter section 110 of the power supply 100 according to the embodiment of the invention, a voltage is only applied to an output terminal. When the converter section 110 is switched on by the switching control signal from the maximum power point tracking section 120, the converter section 110 outputs power. Here, the power detector 121 of the maximum power point tracking section 120 detects a power value of '0', and a maximum power value is also '0'. The detected power value and the predetermined offset power value are added, and the added value is input to a minus terminal of the comparison unit 122b of the comparator 122. The maximum power value is input to a plus terminal of the comparison unit 122b. Since the detected power value is the maximum power value during the initial operation, the comparison result of the comparator 122 has a low level.

Figure 3B:
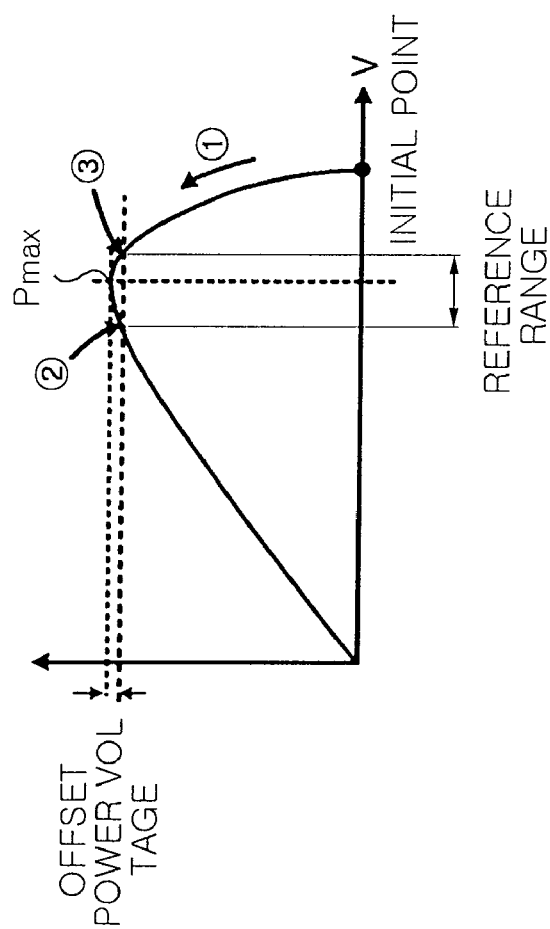
FIG. 3B is a graph illustrating the switching operation of the power supply according to the embodiment of the invention.

Therefore, as shown in FIG. 3B, the switching control signal from the switching controller 123 is a switching-on signal. The switch S of the converter section 110 is turned on, and the power from the solar array A moves along the power-voltage curve as shown by reference numeral ① in FIG. 3A.

Then, a difference between the detected power value and the maximum power value Pmax is equal to or higher than the offset power value. That is, when the detected power value falls below reference numeral ② the comparison result of the comparator 122 has a high level. As shown in FIG. 3B, the switching control signal is a switching-off signal, and the switch S of the converter unit 121 is turned off. Here, the comparison result of the comparator 122 is transmitted to the initializer 124 to initialize the maximum power value stored in the capacitor 121d of the power detector 121.

Then, the power from the solar array A starts to move along a curve from reference numeral ② and reference numeral ③. The comparison result having a low level is output from the comparator 122. Then, when the detected power value falls below reference numeral ③, the comparison result of the comparator 122 is changed from the low level to the high level. As shown in FIG. 3B, the switching control signal from the switching controller 123 is a switching-on signal, and the switch S of the converter section 110 is turned on again. The power from the solar array A moves along a curve from reference numeral ③ to reference numeral ②.

That is, the power from the solar array A tracks the maximum power value Pmax within a predetermined reference range having the maximum power value Pmax by the switching control of the maximum power point tracking section 120. By reducing the offset power value, the power can be more approximate to and track the maximum power value Pmax.

As set forth above, according to the exemplary embodiment of the invention, when a maximum power point tracking function of a power supply, particularly, a solar photovoltaic power generator that generates power using solar radiation, is performed, a maximum power point tracking section formed of a simplified circuit is used instead of using a micro controller so that a detected power value exists within a reference range having a maximum power point in a predetermined power-voltage curve.

While the present invention has been shown and described in connection with the exemplary embodiments, it will be apparent to those skilled in the art that modifications and variations can be made without departing from the spirit and scope of the invention as defined by the appended claims.

What is claimed is:

1. A power supply having a maximum power point tracking function, the power supply comprising:
   a converter section switching input power and converting the switched input power into predetermined DC power; and
   a maximum power point tracking section detecting a power value determined according to a switching operation of the converter section among power values included in a predetermined power-voltage curve, and controlling the switching operation of the converter section so that the detected power value is located within a predetermined reference range having a maximum power value among the power values included in the power-voltage curve, wherein the maximum power point tracking section comprises:
   a power detector detecting the power value from the input power;
   a comparator comparing the power value from the power detector and the maximum power value;
   a switching controller supplying a switching control signal used to control the switching operation of the converter section according to a comparison result of the comparator; and
   an initializer initializing the maximum power value when the switching control signal from the switching controller is a switching-off signal.

2. The power supply of claim 1, wherein the power detector comprises:
   a multiplication unit detecting a current and a voltage from the input power to calculate the power value;
   a peak detection unit detecting the maximum power value among power values from the multiplication unit; and
   an amplification unit electrically connected between the multiplication unit and the peak detection unit, and amplifying the power value from the multiplication unit.

3. The power supply of claim 2, wherein the power detector comprises a capacitor, and the initializer initializes the maximum power value by discharging power charged in the capacitor when the switching control signal is a switching-off signal.

4. The power supply of claim 1, wherein the comparator adds a predetermined offset power value to the detected power value, and compares a result of the addition and the maximum power value, and
   the offset power value is a difference between the maximum power value and a minimum power value within the reference range.

5. The power supply of claim 1, wherein the switching controller is a D flip-flop having a clock terminal receiving the comparison result from the comparator, a Q terminal outputting a signal having a predetermined level, a Q' terminal outputting a signal having an inversion level of a signal level of the Q terminal, and a D terminal receiving the signal from the Q' terminal, and
   the signal from the Q' terminal is the switching control signal.

6. The power supply of claim 1, wherein the converter section comprises:
   an inductor boosting a voltage level of the input power;
   a switch switching the power from the inductor according to the switching control signal;
   a diode rectifying the power switched by the switch; and
   a capacitor stabilizing the power rectified by the diode.

7. The power supply of claim 1, further comprising an inverter section converting the DC power from the converter section into predetermined AC power.

8. The power supply of claim 1, wherein the input power is power supplied from a solar array, and
   the power supply is a solar photovoltaic power generator generating power using sunlight.

9. A power supply, comprising:
   a converter section couplable to a power source and arranged for converting input power from the power source into direct current (DC) output power according to a switching control signal;
   a power detector coupled to the converter section and arranged for detecting a power value of the input power and for storing a maximum power value of the input power;
   a comparator coupled to the power detector for comparing the power value and the maximum power value;
   a switching controller coupled to the comparator for generating the switching control signal according to a comparison result of the comparator; and an initializer coupled to the power detector and configured to selectively initialize the storage of the maximum power value according to the comparison result of the comparator.

10. The power supply of claim 9, wherein the power detector comprises:
    a multiplication unit for detecting a current level and a voltage level from the power source and for generating the power value; and
    a peak detection unit coupled to the multiplication unit and arranged for detecting and storing the maximum power value according to the generated power value.

11. The power supply of claim 9, wherein the power detector comprises a capacitor, and the initializer is a switch configured to initialize the storage of the maximum power value by discharging power charged in the capacitor of the power detector.

12. The power supply of claim 9, wherein the comparator is configured to add a predetermined offset power value to the power value from the power detector, and to compare a result of the addition and the maximum power value.

13. The power supply of claim 9, wherein the switching controller is a D flip-flop comprising:
    a clock terminal for receiving the comparison result from the comparator;
    a Q' terminal for outputting the switching control signal; and
    a D terminal coupled to the Q' terminal.

14. The power supply of claim 9, wherein the converter section comprises:
    a capacitor for stabilizing the output power;
    an inductor having one end couplable to the power source;
    a diode having one end coupled to the capacitor and the other end coupled to the other end of the inductor; and
    a switch coupled to a node between the diode and the inductor and configured to selectively charge the capacitor with the input power from the power source according to the switching control signal.

15. The power supply of claim 9, further comprising an inverter section for converting the DC output power from the converter section into Alternating Current (AC) output power.

* * * * *